United States Patent [19]

Smith et al.

[11] Patent Number: 5,542,102

[45] Date of Patent: Jul. 30, 1996

[54] METHOD AND APPARATUS FOR SIMULTANEOUSLY CONTROLLING BASE STATION AND EXTERNAL ELECTRONIC DEVICE FUNCTIONS

[75] Inventors: Sybren D. Smith; Argyrios Chatzipetros, both of Plantation; Rudy Yorio, Boca Raton, all of Fla.

[73] Assignee: Motorola, Inc., Schaumburg, Ill.

[21] Appl. No.: 283,422

[22] Filed: Aug. 1, 1994

[51] Int. Cl.$^6$ .............. H04M 1/00; H04B 7/26; H04Q 9/00
[52] U.S. Cl. .......... 455/66; 455/88; 455/200.1; 379/61; 379/420; 379/421
[58] Field of Search ............... 455/88, 200.1, 455/92, 355, 89, 66; 379/61, 388, 420, 421

[56] References Cited

U.S. PATENT DOCUMENTS

| 4,873,712 | 10/1989 | Porco | 455/88 X |
| 5,274,454 | 12/1993 | Higgins, Jr. | 358/186 |

FOREIGN PATENT DOCUMENTS

| 2-184157 | 7/1990 | Japan | 379/420 |
| 3-148945 | 6/1991 | Japan | 379/61 |
| 4-81156 | 3/1992 | Japan | 379/61 |
| 4-96456 | 3/1992 | Japan | 379/61 |

*Primary Examiner*—Chi H. Pham
*Attorney, Agent, or Firm*—John G. Rauch; Barbara Doutre

[57] ABSTRACT

A base station (102) automatically remotes to a speakerphone mode of operation and connects an incoming call while an external electronic device (104) is simultaneously controlled.

10 Claims, 2 Drawing Sheets

METHOD AND APPARATUS FOR SIMULTANEOUSLY CONTROLLING BASE STATION AND EXTERNAL ELECTRONIC DEVICE FUNCTIONS

TECHNICAL FIELD

This invention relates to communication systems, and more specifically to private base stations.

BACKGROUND

Home base stations used in second generation cordless telephone (CT2) systems allow a user to use a cordless telephone, or handset, while moving about a predetermined range of the base station. The base station may also be remoted to a speakerphone option that remotes the audio to a speaker within the base station and allows for hands-free operation of the system. With the ever increasing popularity of personal electronic products, such as cordless telephones and pagers, the trend has been to provide a greater number of features and options with these devices. In the home or office environment it is not unusual to have multiple electronic devices such as a stereo or television which may be operating while an incoming call is received at the base station. It would be helpful if the user could simultaneously control some of the features or options associated with these products. An example of such a scenario would be the owner of a handset watching television while an incoming call is received at the base station. The user in all likelihood would want to mute the audio level of the television set while the incoming call is connected. To accomplish this, the user would typically first mute the audio level of the television and then either find the handset or activate the speakerphone residing in the base station in order to respond to the incoming call. If both the task of muting the television audio and answering an incoming call could be accomplished simultaneously, the number of steps required by the user would be reduced. If the user misplaces the handset or leaves it in another room, this feature would also allow him to answer a call without having to move. A need thus exists that allows a user to customize his private base station for interaction with external electronic devices such as stereos, televisions, video cassette recorders, etc.

DETAILED DESCRIPTION OF THE PREFERRED EMBODIMENT

Personal communication systems, such as the second generation cordless telephone system (CT2), may be used in a private environment (office or home) as well as in a public environment. When the CT2 system is used in the private environment, the system comprises a private base station (or base stations) and an individual handset (or handsets) registered to that private base station.

When an incoming call is answered at the private base station, a communication link is established between a telephone network and the base station, using the speakerphone mode option. The speakerphone mode option allows the audio to be remoted to a speaker located within the base station and allows the user to carry on a conversation without the use of a handset (e.g., hands-free operation). Alternately, the user can answer the incoming call using the handset and stay within a predetermined range of the base in order to maintain the communication link.

The preferred embodiment of the invention deals with CT2 private base stations and the control of options associated with these base stations in relation to optional functions of other electronic devices. By using the base station in conjunction with other electronic devices, a user can be provided with multiple functions when an incoming call is connected. In the preferred embodiment of the invention, the CT2 base detects an incoming call and automatically remotes the audio of the incoming call to the speaker while audio generated by a television set or other electronic device is muted.

Figure 1:
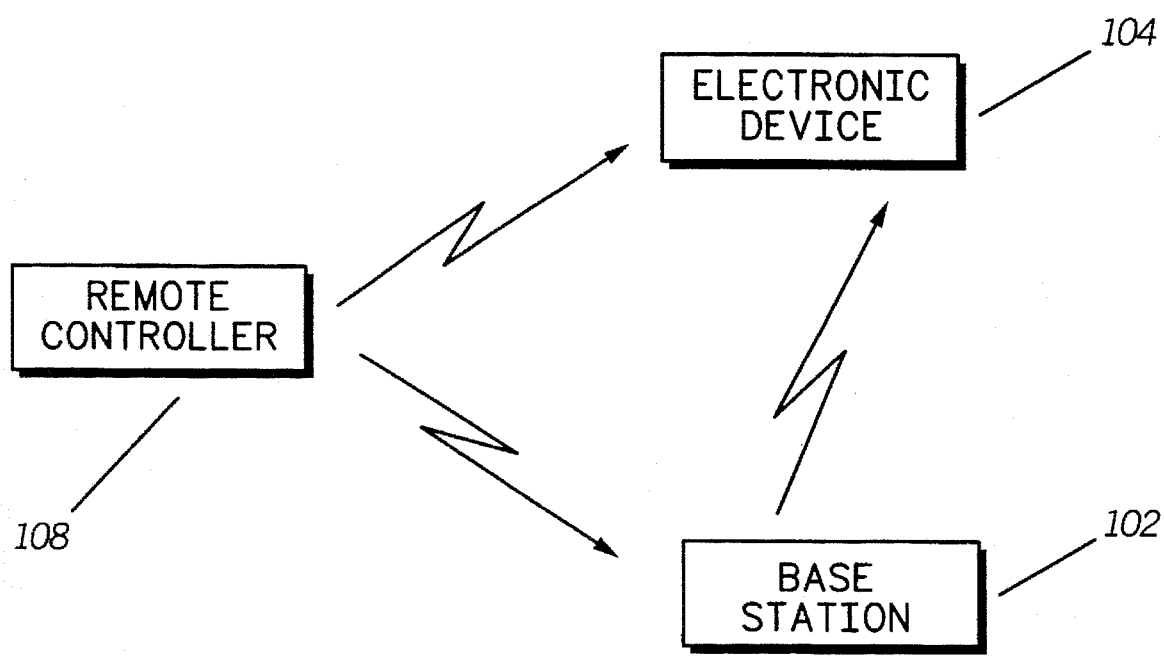
FIG. 1 is a block diagram of a communication system in accordance with the present invention.
Figure 1:
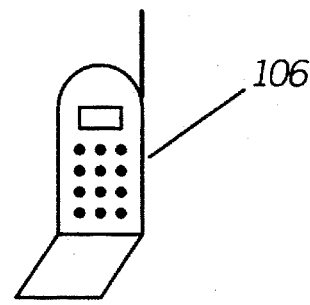

Referring now to FIG. 1 of the accompanying drawings, there is shown a block diagram depicting a communication system in accordance with the present invention. The communication system 100 includes a base station 102 and an electronic device 104, such as a stereo or television set, as would be found in a home or office. In the preferred embodiment the electronic device 104 is a television set. A handset, or radio, 106 is registered to the base station 106 for providing portable calling ability but is not necessary for the preferred embodiment of the invention. Also included in the communication system 100 is a remote control 108 for controlling optional functions such as muting the audio of the television set 104. This remote control 108 may also be programmed to control other electronic devices such as a stereo.

In one embodiment of the invention, the base station 102 automatically remotes to the speakerphone option in order to connect an incoming call when the television set is muted. This could be accomplished by having an infrared receiver located inside the base station and programmed for the infrared pattern associated with the television set. When an incoming call is detected at the base station and the user mutes the audio level at the television set, the base station automatically picks up the call using the speakerphone mode option of operation. In this first embodiment of the invention, the base 102 can be pre-programmed to memorize a signal, such as an infrared signal from the remote control 108, in order to place the base in the speakerphone mode while the television 104 is being muted.

In a second embodiment of the invention, the television set 104 is automatically muted by the base station 102 when the base station is placed in the speakerphone mode of operation to receive a call. One way of accomplishing this is to have the base station programmed to automatically pick up a call after a predetermined number of rings and to automatically mute the television set 104 at the same time the base station automatically picks up the call or when the base station detects the call. This can be accomplished by using an infrared transmitter, preferably located within the base station 102 and programmed with a pattern associated with the mute function of the television set 104. Every time a call is detected at the base station 102, the base mutes the audio level of the television by sending out the programmed infrared signal while picking up the call. Alternately, if the user does not wish to program the base to automatically pick up after a predetermined number of rings, he can just press the speakerphone mode option located at the base station 102 or use the handset 106, and still have the television set muted by transmitting the infrared signal from the base in response to the call being connected.

A first method for controlling audio functions in the base station and the television set includes the steps of receiving an incoming call at the base station, muting the television set, and automatically placing the base station in a speakerphone mode in response to the muting of the television set, and connecting the call. The television set is preferably muted using an infrared signal generated by an infrared transmitter, and this infrared signal can be used to simultaneously mute the television set while placing the base station in a speakerphone mode of operation.

In a second method fur controlling audio at the base station and the television set, a call is received and connected at the base station with the base in the speakerphone mode of operation, by answering the call using the speakerphone mode, an external electronic device has its audio automatically muted. This could be accomplished, for example, by transmitting an infrared signal from the base station to the television set when the speakerphone option is enabled. Both of the previously described methods allow for controlling audio in a base station and an external electronic device.

Figure 2:
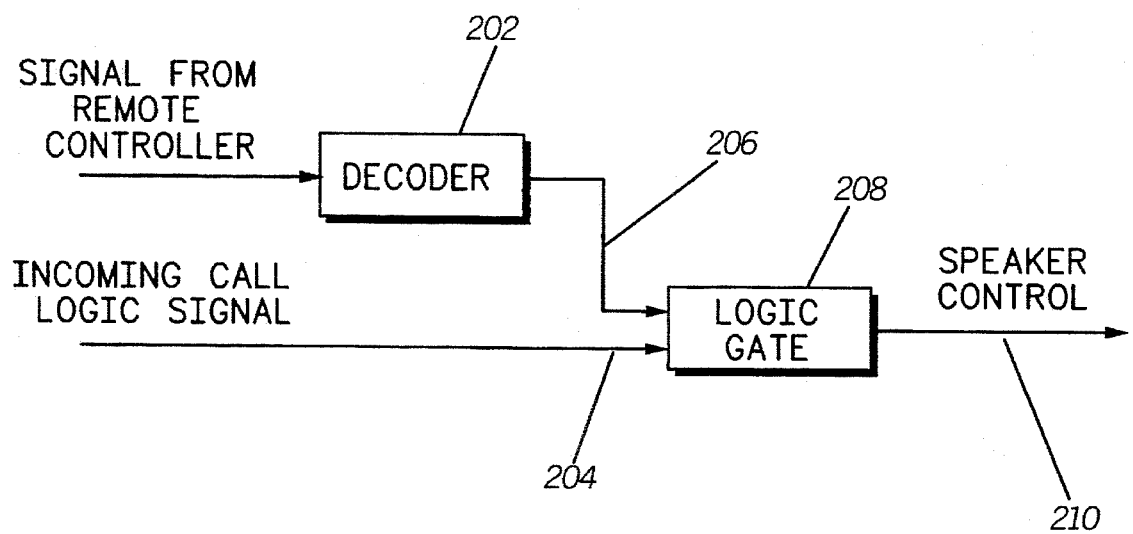
FIG. 2 is a block diagram of speakerphone connection circuitry for a base station in accordance with the present invention.

FIG. 2 of the accompanying drawings shows an example of a block diagram of the internal circuitry for the base station that provides for automatic connection of the speakerphone option. Included in the base station is decoding circuitry 202, preferably for decoding an infrared signal sent by the remote controller 108 shown in FIG. 1. An incoming call is detected by the base station and an incoming call logic signal 204 is generated, preferably by a microprocessor (not shown). The decoder circuitry 202 generates a decoded logic signal 206 that indicates the presence of an incoming signal from the remote controller. The decoded logic signal 206 and the incoming call logic signal 204 are sent to a logic device 208 where a control signal 210 is generated that enables the speakerphone mode option when both and incoming call and an incoming signal from the remote are present.

Hence, the base station as described by the invention reverses the roles of the universal remote that memorizes remote functions of electronic devices. The base station memorizes the mute function of a television and/or stereo controller such that when an incoming call is sensed at the base station and the mute function is enabled, the base station automatically picks up in hands-free mode and the stereo/television are silenced.

Two methods for automatically controlling audio in a base station and electronic device have been described. The first method as described by the invention provides a way of remoting an incoming call to a speakerphone when the audio from a television set is muted. The second method as described by the invention provides a way for controlling audio level in an electronic device, such as a television set, while an incoming call is connected.

While the base station described in the preferred embodiment comprises a CT2 base station, this invention can also be applied to other communication systems that use telephone or radio base stations. Other optional functions of electronic devices can also be coordinated with the speakerphone of the base station. These may include a pause mode of operation for a video cassette recorder or a preset volume level for a stereo. The base station may be programmed to automatically go into a speakerphone mode of operation when an incoming call is detected and the electronic device performs its optional function, as described by the invention.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A method for automatically controlling audio level at a base station and an external electronic device in a communication system including the base station, the external electronic device and a handset, the base station being coupled to a telephone network, the method comprising the steps of:

receiving an incoming call at the base station from the telephone network;

manually muting the external electronic device;

automatically placing the base station in a speakerphone mode of operation in response to the muting of the external electronic device; and connecting the incoming call at the base station.

2. A method as described in claim 2, wherein the step of automatically placing the base station in a speakerphone mode of operation further comprises the step of receiving an infrared signal at the base station, the infrared sisal simultaneously muting the external electronic device and placing the base station in a speakerphone mode of operation.

3. A method for controlling audio level at a base station and an external electronic device in a communication system including the base station, the external electronic device and a handset, the method comprising the steps of:

receiving an incoming call at the base station;

connecting the incoming call at the base station;

manually placing the base station in a speakerphone mode of operation; and automatically muting the external electronic device in response to the base station being in the speakerphone mode of operation.

4. A method as described in claim 3, Wherein the step of manually placing the base station in a speakerphone mode of operation comprises the step of actuating a switch at the base station and wherein the step of automatically muting the external electronic device further comprises the step of transmitting an infrared signal from the base station to the external electronic device in response to the base station being placed into the speakerphone mode of operation.

5. A communication system comprising:

an electronic entertainment device that selectively operates in one of a first mode and a second mode;

a handset configured for voice communication; and a base station configured for radio communication with the handset and for communication with the electronic device, the base station further configured to be coupled with a telephone network for receiving incoming telephone calls, the base station automatically connecting an incoming call in a speakerphone mode of operation in response to manual switching of the electronic device from the first mode to the second mode.

6. A communication system as described in claim 5, wherein the electronic entertainment device comprises a television set that mutes its audio from a first volume level to a second volume level.

7. A communication system as described in claim 5, wherein the electronic entertainment device comprises a video cassette recorder that enters a pause mode of operation from a normal mode of operation.

8. A communication system as described in claim 5, further comprising an infrared transmitter for providing an infrared signal, the electronic device responsive to the infrared signal, and the base station also responsive to the infrared signal, the base station automatically connecting the incoming call in a speakerphone mode of operation in response to the infrared signal.

9. A communication system as described in claim 5, wherein the base station comprises a second generation cordless telephone private base station and the handset comprises a second generation cordless telephone handset.

10. A communication system as described in claim 5, wherein the base station comprises a telephone base station and the handset comprises a telephone handset.

* * * * *

UNITED STATES PATENT AND TRADEMARK OFFICE
CERTIFICATE OF CORRECTION

PATENT NO. : 5,542,102
DATED : July 30, 1996
INVENTOR(S) : Smith et al.

It is certified that error appears in the above-indentified patent and that said Letters Patent is hereby corrected as shown below:

Claim 2

In column 4, line 21, please replace "sisal" with --signal--.

Claim 4

In column 4, line 36, please replace "Wherein" with --wherein--.

Signed and Sealed this

Twenty-fourth Day of June, 1997

Attest:

Attesting Officer

BRUCE LEHMAN

Commissioner of Patents and Trademarks